United States Patent Office 2,827,721
Patented Mar. 25, 1958

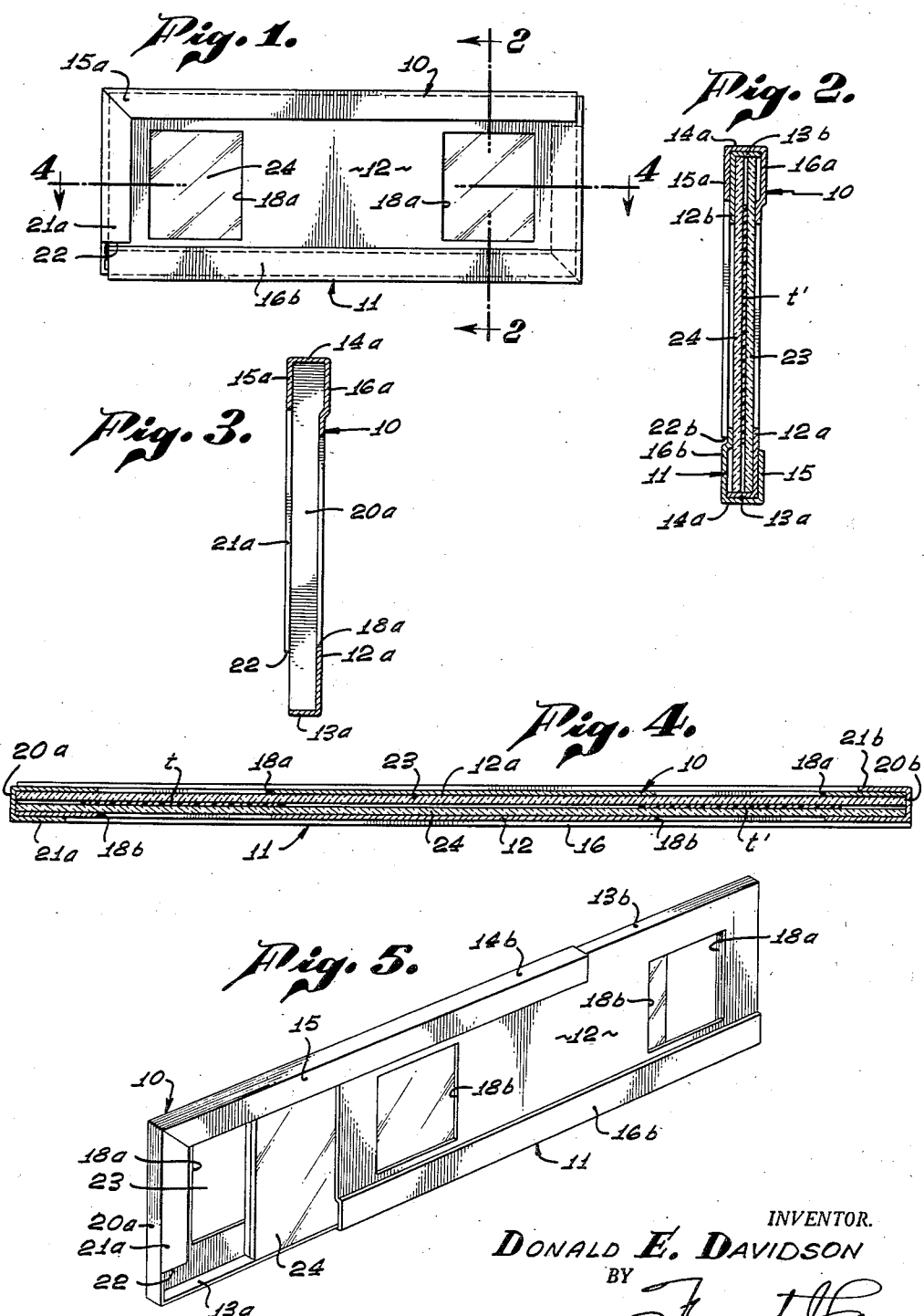

2,827,721

FILM SLIDE HOLDER

Donald E. Davidson, La Habra, Calif.

Application November 12, 1954, Serial No. 468,266

5 Claims. (Cl. 40—155)

My invention relates to a film slide holder, and particularly to slide holders especially adapted for stereoscopic slides, though not necessarily limited thereto.

I am aware that a great many film slide holders and particularly stereoscopic slide holders are known to the art. However, a great many deficiencies are found in the prior art film slide holders. Among these are complexity, lack of ruggedness, cost of manufacture, and difficulty of assembly.

It is accordingly an object of my invention to provide a simple yet effective stereoscopic slide holder, which is cheap to manufacture, and yet which can be assembled readily by inexperienced users.

A further object is the provision of an improved thin sheet metal stereoscopic slide holder, of light and simple construction, yet of substantial ruggedness and durability.

Further objects and the various features and advantages of the invention will become apparent from the drawings and the specifications relative thereto.

In the drawings:

Fig. 1 is a plan view of a stereoscopic slide holder embodying the principles of my invention;

Fig. 2 is an enlarged sectional view taken on line 2—2 of Fig. 1;

Fig. 3 is an enlarged sectional view similar to Fig. 2 but illustrating only one of the elements comprising the slide holder;

Fig. 4 is a sectional view taken on line 4—4 of Fig. 1; and

Fig. 5 is a perspective view of the slide holder shown in a partially assembled position.

The embodiment of the invention illustrated herein comprises a pair of interlocking frame members designated generally 10 and 11, formed of rigid opaque material such as, for example, thin sheet aluminum. The frame members 10 and 11 are identical except for being right and left hand or mirror images of each other. For convenience, corresponding parts of the two frames will be identified by the same reference numerals, but with the suffix "a" added for one frame, and the suffix "b" added for its mirror image frame. The frame 10 will be described in detail, and it will be understood that the frame 11 is identical thereto, excepting for the explained right for left reversal. With this understanding, the frame 10 has a side wall 12a, a longitudinal edge wall 13a comprising a right angle flange bent over from the edge of side wall 12a, and an opposite longitudinal edge wall 14a forming the bottom of a channel. A flange 15a is bent inwardly from wall 14a to complete the channel; and a longitudinally extending portion 16a of the side wall, immediately adjacent wall 14a, and of width comparable with that of flange 15a, is outwardly offset by a distance equal to the thickness of the wall.

The side walls of frame members 10 and 11 are formed with apertures 18a and 18b, respectively, of the sizes of the film frames of the later described transparencies.

Corresponding ends of the two frames 10 and 11 are formed with end walls 20a and 20b bent over from side walls 12a and 12b, respectively, and end return flanges 21a and 21b are bent at right angles from these end walls so as to be co-planar with the longitudinal edge flanges 15a and 15b, respectively. The side and end flanges 15a and 21a, and also the flanges 15b and 21b, may be mitered together as indicated in Figs. 1 and 15. Also, the end flanges 21a and 21b are terminated short of the respective longitudinal edge walls 13a and 13b, as indicated at 23, so as to avoid interference between said end flanges and the outwardly offset side wall portions 16b and 16a, respectively, when the two frames are assembled.

Rigid rectangular sheet members or plates 23 and 24, formed preferably of transparent material such as glass, are disposed between the frame members 10 and 11 and fit snugly between the longitudinal edge walls 13a and 13b. It is apparent that the transparent members 23 and 24 form a part of the structure of the film pack holder in that they space the edge walls 13a and 13b of the two frames and maintain them positioned adjacent the respective edge walls 14b and 14a.

Transparencies t and t' are placed between the transparent plates 23 and 24 and secured in position to register with the apertures 18a and 18b by any suitable means. The plates are then slid into one of the frame members, say the member 10, from its "open" end, i. e., the end opposite to that having the end wall 20a. The other frame member 11 is then "telescoped" with the member 10, its "open" end being first opposed to the "open" end of member 10, its edge wall 13b being then inserted between the wall 14a of member 10 and the opposed edges of the plates 23 and 24, its edge wall 14b going on outside the edge wall 13a of member 10, with its flange 15b outside or overlapping the wall 12a of member 10. Thus the longitudinal channels of the two frames are at opposite edges of the pack, and receive the edge walls 13a and 13b of the opposite frame members, all as clearly shown in Fig. 2. The side walls 12a and 12b slide under the end flanges 21b and 21a, respectively, as the frame members are moved "home" into their position of final assembly. It will be noted that the outwardly offset side wall portions 16a and 16b are co-planar with the edge flanges 15b and 15a, respectively, affording a flat pack which will stack to advantage, and which also provide co-planar bearing faces which come into play when the holder is inserted into the guide slot of a projector.

It is readily apparent that numerous changes may be made in the specific configuration shown which will still be within the scope of the appended claims.

I claim:

1. A film slide comprising a pair of interfitting frame members each including an apertured rectangular side wall, right angular edge walls along two opposite edges of said side wall, said edge walls extending to one side of said side wall, a right angle flange along the free edge of one of said edge walls and extending toward the opposite edge wall in spaced substantially parallel relationship to said side wall, said flange and side wall defining therebetween a channel opening toward and having a width substantially equal to the width of said opposite edge wall, said frame members being telescopically engaged with said edge walls thereof extending toward and overlapping one another and said opposite edge wall of each frame member slideably engaging in the channel of the opposite frame member, and film holding plates between said side walls and having opposite edges in abutment with said opposite edge walls of the frame members to prevent relative lateral movement between the frame members.

2. The subject matter of claim 1 wherein said side walls each have a pair of spaced, rectangular apertures, the apertures in one frame member being aligned with the apertures in the other frame member.

3. The subject matter of claim 1 wherein said side wall of each frame member comprises a pair of substantially parallel offset portions, the juncture of said portions paralleling said one edge wall of the frame member and being spaced from the latter a distance substantially equal to the width of said flange, the portion of the side wall on the side of said juncture remote from said one edge wall being offset toward said flange a distance substantially equal to the thickness of the side wall.

4. A film slide comprising a pair of interfitting frame members each including an apertured rectangular side wall, right angular longitudinal edge walls along the two longitudinal edges of said side wall, an end edge wall along one end edge of said side wall, said edge walls extending to one side of said side wall, a right angle flange along the free edge of one of said longitudinal edge walls and extending toward the opposite longitudinal edge wall in spaced, substantially parallel relationship to the side wall, a flange along the free edge of said end edge wall and extending toward the other end of the side wall substantially in the plane of said first-mentioned flange, said side wall and flanges defining therebetween channels having a width substantially equal to the width of said opposite longitudinal edge wall, said frame members being telescopically engaged with said opposite edge wall of each frame member slideably engaging in the longitudinal channel of the other frame member and said other end of the side wall of each frame member abutting the end edge wall of the other frame member to prevent relative movement of the frame members in one longitudinal direction, and film holding plates disposed between said frame members with opposite edges thereof in abutment with said longitudinal edge walls to prevent relative lateral movement between said frame members.

5. The subject matter of claim 4 wherein said side wall of each frame member comprises a pair of substantially parallel offset portions, the juncture of said portions paralleling said one longitudinal edge wall and being spaced from the latter a distance substantially equal to the width of the flange on the latter edge wall, the portion of the side wall on the side of said juncture remote from said one longitudinal edge wall being offset toward said latter flange a distance substantially equal to the thickness of the side wall, and said end edge wall of each frame member terminating short of said opposite longitudinal edge wall of the respective frame member to receive the other side wall portion of the other frame member when said frame members are telescopically engaged.

References Cited in the file of this patent
UNITED STATES PATENTS

| | | |
|---|---|---|
| 1,857,141 | Corley | May 10, 1932 |
| 2,599,382 | Goldberg | June 3, 1952 |
| 2,690,022 | Sacre | Sept. 28, 1954 |

FOREIGN PATENTS

| | | |
|---|---|---|
| 719,507 | Germany | Apr. 10, 1942 |